(12) United States Patent
Chen et al.

(10) Patent No.: US 6,841,951 B2
(45) Date of Patent: Jan. 11, 2005

(54) SINGLE STAGE HID ELECTRONIC BALLAST

(75) Inventors: Timothy Chen, Aurora, OH (US); James K. Skully, Willoughby, OH (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 10/064,005

(22) Filed: Jun. 4, 2002

(65) Prior Publication Data

US 2003/0222595 A1 Dec. 4, 2003

(51) Int. Cl.$^7$ ............................. H05B 41/16; G05F 1/00
(52) U.S. Cl. ....................... 315/291; 315/246; 315/244; 315/209 R; 315/307
(58) Field of Search ................................. 315/291, 246, 315/244, 209 R, 224, 307, 308, 105, 106, DIG. 7, 200 R, 225, 247, 58, DIG. 5

(56) References Cited

U.S. PATENT DOCUMENTS

| | | | |
|---|---|---|---|
| 5,008,597 A | | 4/1991 | Zuchtriegel |
| 5,569,984 A | * | 10/1996 | Holtslag ..................... 315/307 |
| 5,623,187 A | * | 4/1997 | Caldeira et al. ............ 315/307 |
| 5,796,216 A | | 8/1998 | Beasley ...................... 315/307 |
| 5,932,976 A | | 8/1999 | Maheshwari et al. ....... 315/291 |
| 6,011,362 A | * | 1/2000 | Moisin ........................ 315/307 |
| 6,020,691 A | * | 2/2000 | Sun et al. ................... 315/307 |
| 6,034,489 A | * | 3/2000 | Weng .......................... 315/307 |
| 6,184,630 B1 | | 2/2001 | Qian et al. |
| 6,208,085 B1 | | 3/2001 | Lehnert et al. |
| 6,337,800 B1 | | 1/2002 | Chang |
| 6,417,631 B1 | * | 7/2002 | Chen et al. ................. 315/291 |
| 6,483,252 B2 | | 11/2002 | Bruning |
| 6,495,971 B1 | | 12/2002 | Greenwood et al. |
| 2002/0191429 A1 | * | 12/2002 | Nadd et al. ................. 363/132 |

* cited by examiner

*Primary Examiner*—Don Wong
*Assistant Examiner*—Chuc Tran
(74) *Attorney, Agent, or Firm*—Fay, Sharpe, Fagan, Minnich & McKee, LLP

(57) ABSTRACT

An HID ballast, is powered by a power source, to control operation of a load. The HID ballast includes a switching network connected to a first bus and a second bus, and is configured to output a high-frequency voltage signal. A bridge converter section has a first leg including first and second series connected bridge diodes, and a second leg including third and fourth series connected bridge diodes. Each leg is connected to the first bus and the second bus and is configured to receive an input signal from the power source and to convert the input signal into a form usable by the switching section. The bridge converter section is integrated with the switching section to provide the usable signal to the switching section, and to contribute to the operation of the switching section. By this design, the HID ballast is defined as a single-stage ballast device.

16 Claims, 3 Drawing Sheets

US 6,841,951 B2

SINGLE STAGE HID ELECTRONIC BALLAST

BACKGROUND OF INVENTION

LD 11691 The present application is directed to electronic ballasts, and more particularly to a single stage High Intensity Discharge (HID) electronic ballast.

HID electronic ballasts have been gaining in popularity due to their efficiency and capability to increase the life of a lamp associated with the HID ballast. It is also known that HID electronic ballasts permit easy control of lumen output of the lamp when compared to other ballast types.

However, certain drawbacks have limited the implementation of HID ballasts. One of these drawbacks is related to acoustic resonance issues. Particularly, if a lamp, such as an HID lamp, is operated at a frequency in its acoustic resonant range, the life of that lamp will be reduced. HID ballasts now available commonly implement a low frequency square waveform output to the lamp to avoid the acoustic resonant due to the high frequency operation.

Another drawback is that existing HID ballasts are implemented in multiple independent stages. For example, in a three-stage ballast, the first stage is designed to convert an AC input signal to a DC output voltage. This conversion is commonly accomplished through the use of a power factor correction stage. Therefore, the first stage performs the conversion to a roughly regulated DC voltage and also corrects the circuit power factor. Correction of the power factor is intended to provide low Total Harmonic Distortion (THD), and high power factor to input line current. A second stage may be a buck converter stage used to regulate the output current. This second stage is directed to converting DC voltage to DC current output by controlling the duty cycle of the buck converter. A third stage is used to supply an AC current to the lamp. Commonly, lamps are designed to operate on the AC current. Therefore, the third stage acts to convert the DC current to an AC current. In one embodiment, the third stage may be implemented through the use of a full-bridge converter circuit. This third stage may be combined with an igniter circuit to start associated HID lamp, which will often require an approximately a 3 kv starting pulse in order to break down the gas within the lamp envelope.

As may be realized from the above discussion, ballasts implementing multiple stages require a large number of components, resulting in higher configuration and construction costs and an increase in the likelihood of component failures. These high costs, need for many components, and lack of reliability are additional factors why HID electronic ballasts are not implemented and used as widely as possible.

Attempts to address existing drawbacks have been made. One particular attempt is described in Maheshwari, et al., U.S. Pat. No. 5,932,976. This patent implements, as in the previous systems, a low frequency square waveform output. The stated innovation is the combination of a high frequency starting operation with a low frequency output. However, this patent still implements three stages, wherein a high number of components are used, resulting in lower reliability and high configuration and construction costs.

A second patent addressing HID ballasts, is to Beasley, U.S. Pat. No. 5,796,216. In the '216 patent, instead of the lamp being driven at a high frequency at start-up and being driven at a low frequency during steady state operation, the lamp is also operated at a high frequency during steady state operation, sufficient to avoid acoustic resonance frequency of the lamp. In design, the circuit of '216 implements a high power factor correction stage which converts AC voltage input to a DC voltage output. Then the input current is controlled to provide a low THD and a regulated output. Another stage is a half-bridge inverter circuit which converts the DC signal to an AC signal to drive the lamp with a series resonant circuit.

The high frequency achieved by the resonant circuit during the starting phase is turned into a third harmonic of the driver frequency. So during the starting phase, the series resonant parallel loaded circuit is unloaded and the resonant frequency is resonating on the third harmonic of the drive frequency. Therefore, for example, if the switching frequency is 100 kHz, then the frequency at the third harmonic is 300 kHz, and the output to the lamp will see is the 300 kHz.

Thus, U.S. Pat. No. '216, uses a third harmonic resonance for starting of the lamp, which is intended to reduce the stress in the inverter circuit, as well as stress to the inductor and to the half-bridge circuit. However, a drawback with this design is the circuit needs to be precisely tuned, which makes the manufacturing process a very complicated undertaking. Since, if the tuning of the circuit is not accomplished properly, it results in poor circuit performance and, thereby brings into question reliability issues. This circuit also is a multi-stage design bringing into issue component count, costs and reliability.

SUMMARY OF INVENTION

An HID ballast, is powered by a power source, to control operation of a load. The HID ballast includes a switching network connected to a first bus and a second bus, and is configured to output a high-frequency voltage signal. A bridge converter network has a first leg including first and second series connected bridge diodes, and a second leg including third and fourth series connected bridge diodes. Each leg is connected to the first bus and the second bus and is configured to receive an input signal from the power source and to convert the input signal into a form usable by the switching network. The bridge converter network is integrated with the switching network to provide the usable signal to the switching network, and to contribute to the operation of the switching network. By this design, the HID ballast is defined as a single-stage ballast device.

DETAILED DESCRIPTION

Figure 1A:
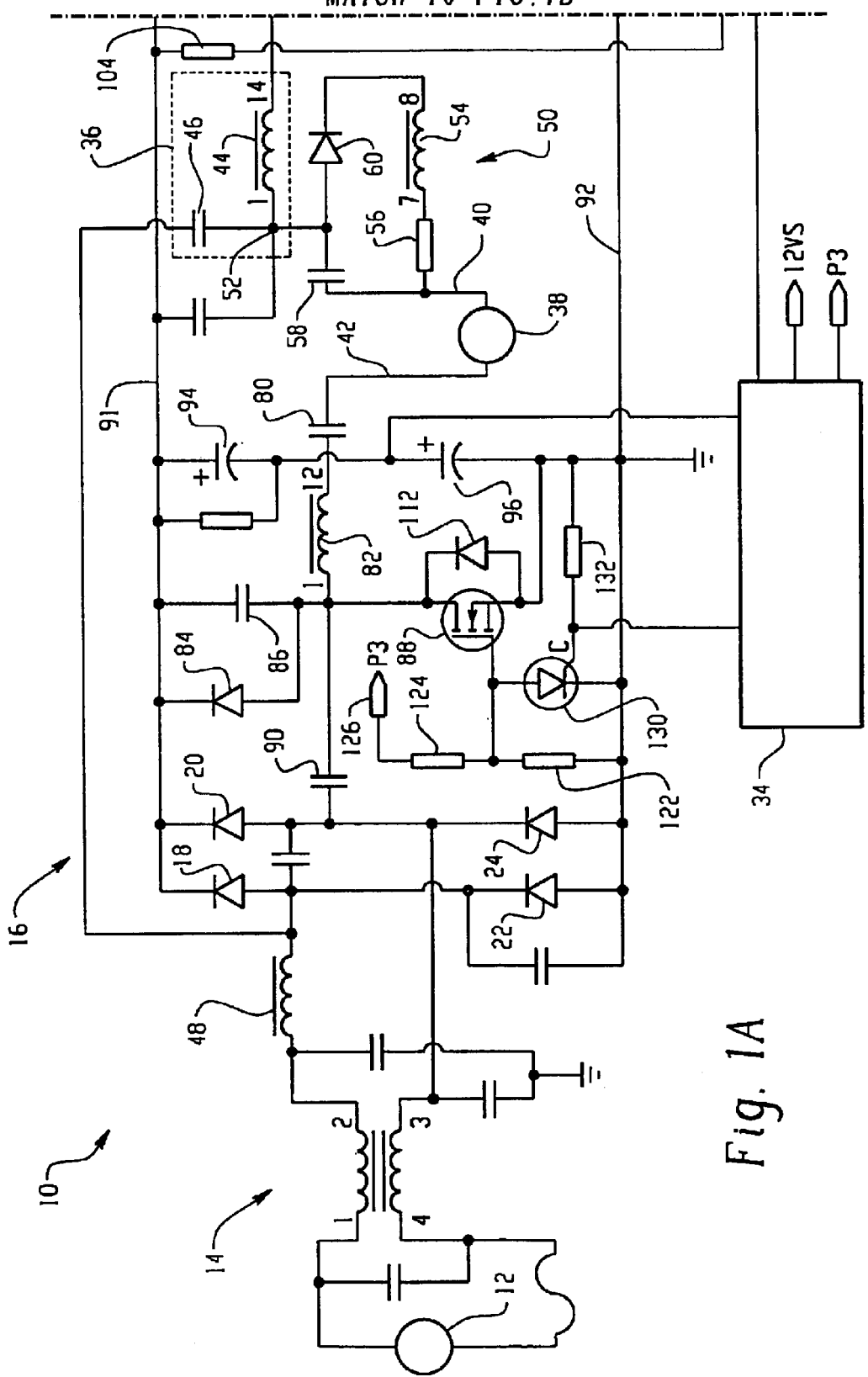
FIGS. 1A–1B sets forth an embodiment of an HID electronic ballast.
Figure 1B:
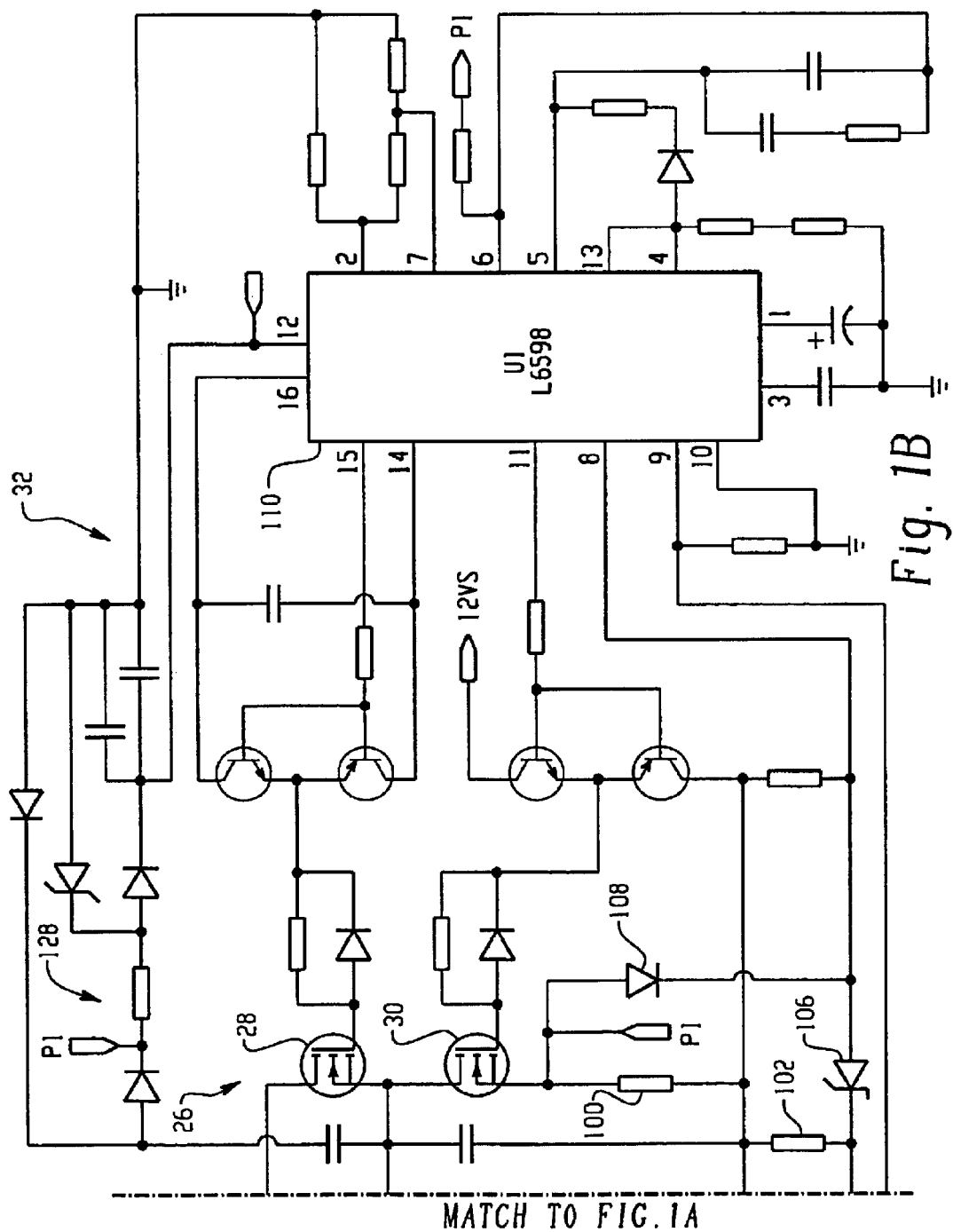

Turning to FIGS. 1A–1B, illustrated is a HID electronic ballast circuit 10. HID electronic ballast 10 is a single stage ballast design which combines a power factor correction circuit and an inverter circuit. In addition to the power factor correction circuit and switching inverter circuit being integrated into a single stage, a full-bridge rectifier is also integrated with the switching inverter circuit. A general discussion of the integration between a full-bridge circuit and a switching inverter circuit is discussed in U.S. application Ser. No. 09/778,337, entitled Integrated Bridge Inverter Circuit for Discharge Lighting, filed Feb. 7, 2001, Notice of Allowance mailed Feb. 26, 2002, wherein the application is herein fully incorporated by reference.

A fundamental frequency is used to supply a load during starting and operating phases, such as a lamp, as opposed to use of a third harmonic frequency. The circuit is designed to sweep from a high frequency to a low frequency during start-up in order to build up a starting voltage. By this design, when the voltage across the lamp reaches a sufficient value, it will break down the gas in the lamp to start operation. Due to this sweeping of the frequency from a high frequency to a low frequency, the tolerances of circuit components do not need to be as tie as in circuits having other operational designs. In instances where the lamp does not fire (start), and the current in the inverter switching devices have reached a predetermined level, then the HID electronic ballast is shut down.

In HID ballast circuit 10, a power source 12 provides input power to an input filter section 14 which supplies filtered input to a full-bridge rectifier section 16, including diodes 18, 20, 22 and 24. A half-bridge converter (switching inverter) section 26, including switches 28 and 30, is driven by a driving circuit section 32 which in turn obtains signals from a timing circuit block 34.

The illustrated circuit design eliminates the separation between the full-bridge rectifier section 16 and the switching inverter section 26. Thus, in this embodiment, diodes 78, 20, 22 and 24 which comprise the full-bridge circuit section 16, are integrated into the switching inverter section 26, and do not simply rectify input, but are made part of the inverter section 26. Particularly, the full-bridge diodes 18–24 are operationally connected to the inverter circuit components 28 and 30 as well as being connected to the input power circuit components of input filter section 14.

Also illustrated in FIGS. 1A–1B is resonant lamp circuit 36 which receives power from switching inverter section 26 to supply a load 38, such as an HID lamp connected across terminals 40 and 42. Resonant load circuit 36 includes a main resonant inductor 44 and a main resonant capacitor 46. The main resonant capacitor 46 connects at one end to main resonant inductor 44, and at its other end to the input of full-bridge section 16 at a junction between diodes 18 and 22, and to input inductor 48 of input filter 14.

Also part of HID ballast circuit 10 is level shifting circuit 50, which is placed in series with a resonant circuit output at a junction 52 of main resonant inductor 44 and main resonant capacitor 46. Level shifting circuit 50 is configured to include winding 54, which is coupled to main inductor 44. The level shifting circuit further includes level shifting resistor 56, capacitor 58 and diode 60.

Level shifting circuit 50 operates to shift a high frequency start-up voltage signal required to start an HID lamp. This concept is more particularly illustrated by FIGS. 2 and 3.

Figure 2:
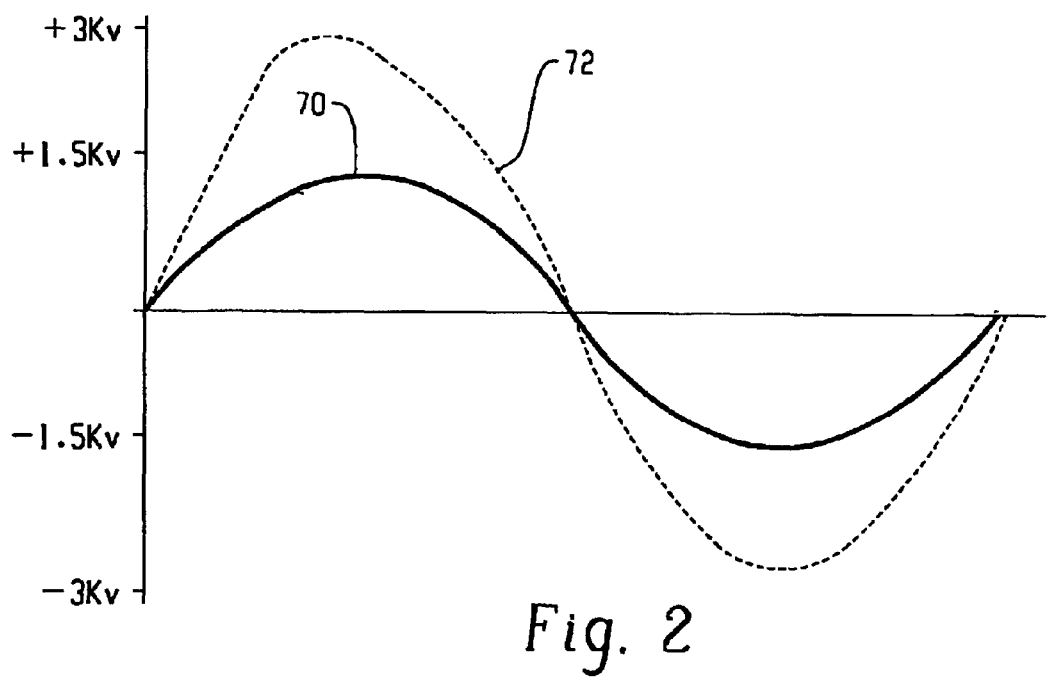
FIG. 2 depicts high frequency voltage waveforms which may be used in existing systems.

In FIG. 2, a high frequency start-up voltage signal 10 is shown to be a waveform which fluctuates between +1.5 kv and −1.5 kv. It is known, however, that many HID lamps require 3 kv as a starting voltage. In existing ballast systems, in order to achieve the required 3 kv, the input voltage is commonly increased to have a +3 kv peak and a −3 kv peak voltage waveform 72. One process by which this is undertaken is to simply provide more current and voltage to the circuit. However, increasing the starting voltage in this manner has several drawbacks, including the need to use higher voltage rated components to handle the increased input. Another drawback is, by increasing the circuit current, the stress on the individual components will also be increased.

Figure 3:
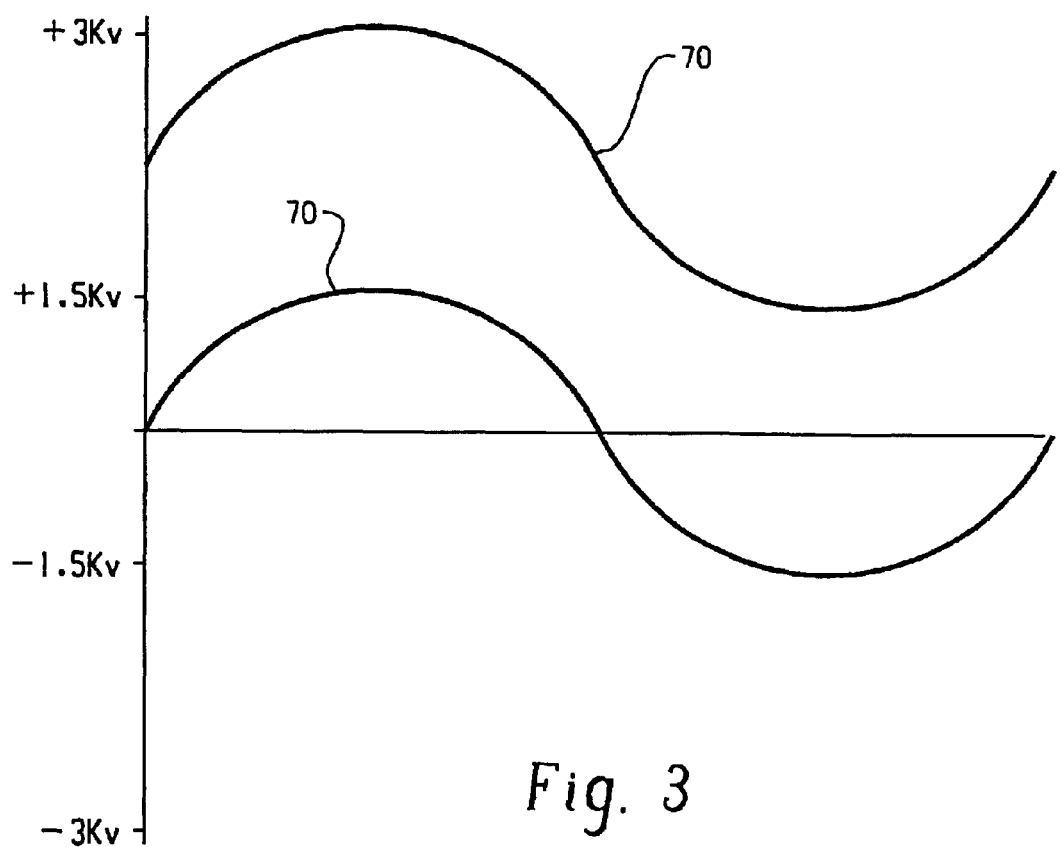
FIG. 3 depicts a level shifted starting voltage to a HID lamp during the starting obtained through the circuit of FIGS. 1A–1B.

HID ballast 10, instead of requiring a higher lamp voltage start-up signal, the level shifting circuit 50 of FIGS. 1A–1B, is implemented to shift the high frequency lamp voltage signal as shown in FIG. 3. Specifically, the high frequency lamp voltage 70 has a 1.5 kv peak. Level shifting circuit 50 shifts this signal up approximately 1.5 kv. By this configuration, the same AC signal will provide the 3 kv peak voltage to start the lamp. It is to be understood while a 3 kv peak voltage is a common peak starting voltage for HID lamps, the present application may also be applied to systems and lamps having different starting requirements.

Returning attention to FIGS. 1A–1B, operation of level shifting circuit 50 is discussed in greater detail. As previously noted, level shifting circuit 50 is designed by having level shifting winding 54 coupled to main inductor 44. This coupled winding arrangement provides energy to level shifting resistor 56 and level shifting diode 60 in order to charge level shifting capacitor 58. In this manner, a DC voltage level is added to the signal supplied to lamp 38 held between terminals 40 and 42. Therefore, in this embodiment, use of level shifting circuit 50 provides a peak voltage sufficient to start the lamp without increasing the current through the resonant components. Therefore, the peak voltage supplied to the lamp is increased without requiring an increase in the component sizes and/or increasing the stress on the components.

The level shifted voltage is not particularly desirable once the lamp 38 is in a steady operational state. To address this issue, a canceling device 80 such as a canceling capacitor, is placed in series on a side of the lamp 38 opposite level shifting circuit 50. Canceling device 80 is used to cancel the level shifted voltage generated across level shifting capacitor 58. This canceling operation takes place after lamp 38 has fired and is in an operation mode. Particularly, even after lamp 38 fires, level shifting circuit 50 is still operational. Therefore, canceling device 80 is made operational to remove this DC bias, since lamp 38 does not require the high DC voltage when in an operational state.

It may be appreciated from FIGS. 1A–1B that this level canceling device 80 is also in series with inductor 82, where one end of inductor 82 is connected at a junction to diode 84, capacitor 86 and an active switching device 88, in which in one embodiment may be an FET. In this circuit, 88 is used to provide the duty function for the provided lamp signals. It is noted that in the application Ser. No. 09/778,337, the function presently provided by active switching device 88 was accomplished by a passive switch design such as a diode or other passive device. More detail regarding the active switching provided by active switching device 88 will be discussed in greater detail in following sections of this discussion.

It is noted that there are two feedback loops to the full-bridge section 16 of HID ballast circuit 10. The first feedback, as previously mentioned, is via resonant capacitor 46 to a connection between diodes 18 and 22. The second feedback is through capacitor 90, which is connected at a first end to a junction between diodes 20 and 24 of the full-bridge circuit 16. The other end of capacitor 90 is connected to the junction including diode 84, capacitor 86 and active switching device 88, as well as an end of inductor 82. The second feedback loop, through capacitor 90, is within the lamp current path. However, only a portion of the lamp current is fed back to the full-bridge section 16. This is true since another portion of the lamp current may pass through circuit components diode 84, capacitor 86 and active switching device 88, thereby returning back to high bus 91 or common bus 92. Thus, all of the lamp current is not returned back to the input portion of the full-bridge section 16.

On the other hand, and on the other side of the circuit, i.e., the resonant side of the circuit, all current is fed back through the feedback loop with resonant capacitor 46. This design is used to achieve a power balance between the input power and the power delivered to the lamp 38. Once these elements are balanced, a high power factor is achieved, as well as a low THD. If the elements of the circuit are not balanced, the THD will suffer and the bus voltage will be over-boosting (i.e., oversupplying) the half-bridge switching inverter circuit section 26 (switches 28 and 30). The balancing provided by this design is beneficial to the HID ballast, since the power factor correction circuit is combined or integrated with the inverter circuit section 26. Without the integration, such balancing is not overly important, since they are in separate stages and an input of one stage is simply fed by the output of the preceding stage.

HID electronic ballast circuit 10 of the present embodiment addresses the issue of obtaining voltage sufficient to start an HID lamp. As previously noted, one manner of obtaining this higher voltage in the prior art, was simply to supply a higher power input to the circuit. This procedure was effective in increasing the peak voltage received by the lamp. However, this procedure also increased the current which must be handled by the components, thereby also increasing the stress on the components and/or the requirement of much larger components, which results in an increase in the cost. On the other hand, use of the level shifting circuit 50 and canceling system or device 80, provides a level shift of the voltage to the lamp during the start operation, without increasing the stress on the circuit components or requiring higher rated components.

Turning to another aspect of the HID ballast 10 of FIGS. 1A–1B, HID ballast 10 is designed to be a discrete device separate from the lamp. Therefore, it is common that the HID ballast 10 is engineered to outlast the lamp which it is powering. More specifically, in one embodiment, the HID ballast is designed to have a life expectancy two or three times or more the predicted life of its HID lamp. Since the HID ballast is designed to outlive the lamp, it is useful to provide protection circuitry to protect it when the lamp comes to its end of life, or is otherwise damaged or defective.

HID ballast 10 is also designed with an understanding of another aspect of HID lamps. In particular, it is known that hot HID lamps are much more difficult to start than HID lamps which are in a cool or cold state. In some instances, the starting voltage for a hot HID lamps may be 25 kv or higher, compared to the 3 kv for a cool or cold HID lamp. Another aspect of the HID ballast 10 is the protection built into the ballast which permits the circuit to determine that a lamp is not starting during a start-up operation. In these instances, it is desirable for the HID ballast to be able to shut itself down for self protection.

To address the needs in consideration of the foregoing noted characteristics of an HID lamp, and a desire to protect the HID ballast, additional circuitry of the present application will be discussed.

HID ballast 10 not only has the ability to observe the resonant switching current, but also the bus voltage across switching FETs 28 and 30 of the half-bridge switching inverter circuit section 26. This voltage may also be detected across series connected capacitors 94 and 96, which in one embodiment may be electrolytic capacitors. Capacitors 94 and 96 are commonly used in high voltage embodiments of the circuit for energy storage.

With further attention to the protection circuitry of HID ballast 10, resistor 100 is placed in series with the source of FET 30. Resistors 102 and 104 are formed as a divider network of electrolytic capacitors 94 and 96. The junction between resistors 102 and 104 is connected to one end of zener diode 106. The opposite end of zener diode 106 is connected to the first end of peak detector diode 108, whose opposite end is connected to the junction of resistor 100 and the source of FET 30. The described circuitry is then connected via a connection line to an enable pin (pin 8) of integrated circuit 110. In this embodiment, integrated circuit 110 may be a high frequency resonant inverter control circuit (such as designation L6598). It is to be appreciated that, while integrated circuit 110 is specifically designated as a particular integrated circuit, in this embodiment, other integrated and non-integrated circuitry which provides similar functionality may also be used in conformance with the concepts of the present application.

The just-described protection circuitry of HID ballast 10 will protect the circuit against undesirable current and voltage levels whether the circuit is in a start-up phase, a running phase, or when a lamp is replaced.

When current in the HID ballast 10 has exceeded an acceptable level, a peak detection arrangement of the previously described circuitry senses this excessive current. More specifically, as current flows through resistor 100 and voltage is being built up for the start of lamp 38, this current is being detected by peak detector diode 108. The current flowing through peak detector diode 108 is forwarded to the input line enable pin 8 of chip 110. If, for whatever reason, the current received at enable pin 8 is higher than a predetermined value, the enable signal goes low and integrated circuit 110 dis-enables operation of HID ballast 10. This excessive current may occur for a variety of reasons, including a failure of the lamp to enter a start state, if no lamp is connected when the HID ballast is made operable, or if a lamp has become non-functional. The value of the current received at the enable pin 8 which would require a shutdown of HID ballast 10, would be some value above a normal running current and would also be above the peak current required to start the lamp.

As previously noted, since HID ballast 10 is a single-stage design, it is desirable to provide a power balance within the circuit. Particularly, if the bus voltage becomes too high, damage may occur to the ballast. Thus, the present HID ballast uses the previously described resistor divider circuitry, including resistors 102 and 104, along with zener diode 106 to ensure that if the bus voltage reaches an undesirable level, the HID ballast circuit is shut down.

One instance when the circuit may become out of balance is when the lamp is not lighting or entering the firing stage. This means balance between the input voltage and the output voltage does not exist since the lamp is not drawing any power. Therefore, all the power being provided from the input will continue to build the bus voltage up to a point where it will begin to break down the components of the HID ballast 10. Therefore, the protection circuitry discussed above is used to monitor the bus voltage, and when the bus voltage across resistor 104 reaches a predetermined value, zener diode 106 will break down, which will trigger a signal to the enable line 8, thereby disabling operation of HID ballast 10.

Turning to another aspect of the present application, when certain lamps such as Compact Fluorescent Lamps (CFL) and linear fluorescent lamps start operation, they substantially immediately transition to their normal operating parameters. On the other hand, an HID lamp will operate as a very low impedance circuit prior to entering its normal operation state. So during that low impedance state, the lamp voltage will be very low, whereas lamp current will be very high. This situation or period will exist anywhere from approximately 2 to 5 minutes after startup until the lamp warms up and reaches its normal operating parameters or steady state.

Further, once a lamp begins its breakdown process, it must transition from a glow stage to the generation of an arc. During this transition period, there needs to be sufficient glow power to allow for transition to the arc state. If the supplied glow power is not sufficient, the lamp will not be able to make the transition to the arc state or may take too long to enter into the arc state, which will result in a negative impact on the lamp life and/or component life. In these transition states it is possible a ballast will go out of power balance.

HID ballast 10 has been designed to address these aspects of HID lamps. In particular, active switching device 88 is provided to address these issues.

Active switching device 88 will commonly operate during the initial warm-up time of the lamp, i.e., from lamp break down to lamp warm up, and is usually not intended to function once the lamp is operating at its steady state parameters. In many instances, therefore, it will only be operational for 2 to 3 minutes or up to approximately 5 minutes, or more as the case may need. Further, it does not need to have a low rds on value to ensure the power dissipation is low due to its short on-times.

In one embodiment active switching device 88 may be a low current carrying low speed system or device. This makes it possible to use a low-cost active switching design.

Again, since HID ballast 10 is a single stage design, maintaining a proper balance between the input power and output power is important, since, if a balance does not exist, then the bus voltage rises to undesirable levels. This unbalanced state commonly occurs during the glow-to-arc transition time period and during the warm-up time period after starting.

If the balance is out of control, the bus voltage will continue to increase until the circuit fails due to damage to component and/or the lamp. To address this issue, active switching device 88, has been included in HID ballast 10. By inclusion of this active switching, during the glow-to-arc stage, following the breakdown of the lamp, PWM or other control schemes can be used to either increase or lower the bus voltage to maintain the desired balance.

In order to increase the voltage, which is supplied to the lamp, the active switch turned off. Alternatively, if the bus voltage is supplying too much voltage to the lamp, then by turning on the active switching, the bus voltage is lowered, resulting in less power being supplied to the lamp. Particularly, when active switching device 88 is turned on, current flowing through the lamp 38, capacitor 80, and inductor 82 flows through active switching device 88 to common bus 92.

When in an off state, the feedback loop including capacitor 46 and/or feedback loop including capacitor 90 will provide power back to the bus thereby raising the input bus values. By monitoring the bus voltage, and controlling operation of the active switching device 88, a proper balance of the input power and the output power obtained so that an adequate glow voltage is sufficiently supplied to the lamp permitting the lamp to transition from a glow stage to an arc stage.

With specific reference to the noted stages of an HID lamp, to increase the glow power to the lamp, the active switching device 88 is turned off for a longer time period. This again may be accomplished through PWM or other control. Further, if the bus voltage reaches too high of values, the active switching device 88 is maintained in an on state by PWM control for a longer time period. The lamp current may also go back to the bus through components diode 84 or capacitor 86.

By use of this active switching and PWM control, a boosted voltage is provided to the lamp to ensure a fast transition from the glow-to-arc stage. During the warm-up stage, a lamp is not drawing large amounts of power, but rather has large amounts of current. Without controlling this operation, the bus voltage would again rise up in an undesirable manner. Therefore, during the warm-up stage, which may last 2 to 5 minutes, the active switching device 88 may be on for the entire warm-up stage or a majority of the warm-up time period. Once the lamp has been on for sufficient time in the warm-up stage, such that the lamp moves to its normal operating parameters, and is operating in its normal mode, the active switching device 88 is then placed in an off state.

It is noted that when an FET is used as the active switching device 88, it includes an intrinsic diode such as intrinsic diode 112. Therefore, when the FET is in the off state, switching may occur dependent upon the value of the lamp's current. For embodiments which use other active switching devices, other components may be used in place of the intrinsic diode.

Thus, the sequence of operation is for the active switching device 88 to be in an on state when power is initially applied, until the beginning of the breakdown of the lamp. When the lamp enters the breakdown or glow-to-arc stage, active switching device 88 is pulse width modulated to provide sufficient glow power for the transition from the glow to the arc stage. Thereafter, the lamp enters its warm-up stage, which may last from 2 to 5 minutes. During this time period, the active switching device 88 is on for either all or a majority of this time to ensure a proper balancing of the input and the output power. Lastly, once the lamp reaches its normal operation or steady state, active switching device 88 is again turned off.

Control of active switching device 88 may be accomplished by a variety of mechanisms, including timing circuit block 34. Timing circuit block 34 may include control logic in the form of individual components or as an integrated circuit, such as a timing chip or microprocessor. Therefore, while timing circuit block 34 is shown in block diagram in FIGS. 1A–1B, it is to be appreciated that various individual components may be arranged to obtain the desired timing sequences which are appropriate either by the individual component arrangements or through the use of an integrated chip.

The intrinsic diode 112 of active switching device 88 is also described as a built-in anti-parallel diode. Therefore, when active switching device 88 is turned off, the anti-parallel parasitic diode 112 acts as a switching mechanism which operates in the same manner as the switching process of the incorporated-by-reference application Ser. No. 09/778,337.

Timing circuit block 34 may also implement a limit to attempt to start up a lamp, and when the attempted time is longer than a predetermined time, a non-enable signal may be entered which causes the system to dis-enabled for a selected period of time, to allow the lamp to cool down.

Also shown in FIGS. 1A–1B is a power circuit employed by resistive divider circuit resistor 122 and 124 where resistors 122 and 124 are joined at a node at the gate of active switching device 88. The second end of resistor 122 is tied to common, and the second end of resistor 124 is connected to a connector pin 126, which is in operative connection to a power supply generator circuit 128 for converter circuit 20. A Silicon Controlled Rectifier (SCR) 130 is connected at one end of active switching device 88, and resistors 124, 126, and at its other end to the common bus 92. The gate of the SCR 130 is connected to resistor 132, which in turn is connected to common bus 92. By use of this design, if for some reason the lamp 38 does not start and the circuit is disabled, then the power to active switching device 88 is resupplied, to provide an automatic reset of active switching device 88. Particularly, if the lamp 38 does not start after a predetermined time, the circuit will be reset including the timing circuit 34. If the lamp starts, then power is continued and the system operates as normal.

It is to be noted that various components have not been individually recited and discussed. While these components are part of the described circuit, the operation and function of these components in the circuit would be understood by one of ordinary skill in the art without further description. Therefore, the description of these components is not considered to add to the teaching of the invention. It is also to be appreciated that while specific component types were mentioned, the present application envisions other components and arrangements of components which have equivalent functionality to be equally applicable to accomplish the goals and details of the present application.

The described topology provides several benefits, including a high-power factor, which is a range of up to 99%, with a total harmonic distortion (THD) lowered by as much as 5% or more. This design ensures the meeting of existing IEC standards such as IEC-61000-3-2 for harmonic distortion. Also, the crest factor obtained by the HID ballast of FIGS. 1A–1B may be 1.4 to 1.9 or preferably approximately 1.7. This design will also minimize the current stress on switches 28 and 30.

In one embodiment, the component values for such a circuit as described herein may include, but are not limited to:

| Component Number | Component Value |
| --- | --- |
| Diodes 18–24 | 1N4937 |
| Converter switches 28, 30 | W20NM50 |
| Resonant inductor 44 | 70 microhenries |
| Resonant capacitor 46 | 0.022 microfarads (1600 V) |
| Filter inductor 48 | 2 millihenries |
| Level boosting inductor 54 | 90 microhenries |
| Level boosting resistor 56 | 10K ohms |
| Level boosting capacitor 58 | 0.22 microfarads (630 V) |
| Level boosting diode 60 | 1N4937 |
| Level lowering capacitor 80 | 0.22 microfarads (630 V) |
| Inductor 82 | 40 microhenries |
| Diode 84 | egp30j |
| Capacitor 86 | 1500 picofarad (1000 V) |
| Switching FET 88 | (stp10nc50) IRF214 |
| Feedback capacitor 90 | 0.03 (1600 V) |
| Upper capacitor 94 | 330 microfarads (250 V) |
| Lower capacitor 96 | 330 microfarads (250 V) |
| Resistor 100 | 0.1 ohms |
| Resistor 102 | 68 K ohms |
| Resistor 104 | 1.5 M ohms |
| Zener diode 106 | 68 volts |
| Diode 108 | 1n414b |
| Integrated circuit 110 | L6598 |
| Resistor 122 | 10 K ohms |
| Resistor 124 | 150 K ohms |

-continued

| Component Number | Component Value |
| --- | --- |
| SCR 130 | 20 volts |
| Resistor 132 | 1 K ohms |

While the invention has been described with reference to the preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An HID ballast powered by a power source, to control operation of a load, the HID ballast comprising:
   a switching section connected to a first bus and a second bus, and configured to output a high frequency voltage signal; and
   a full bridge rectifier section having a first leg including first and second series connected bridge diodes, and a second leg including third and fourth series connected bridge diodes, each leg connected to the first bus and the second bus, and configured to receive an input signal from the power source and to convert the input signal into a form usable by the switching section, the full bridge rectifier section integrated with the switching section via a first feedback loop including a first feedback capacitor and a second feedback loop including a second feedback capacitor, to provide the usable signal to the switching section and to contribute to operation of the switching section, wherein the HID ballast is a single stage device.

2. An HID ballast, powered by a power source, to control operation of a load, the HID ballast comprising:
   a switching section connected to a first bus and a second bus, and configured to output a high frequency voltage signal;
   a full bridge rectifier section having a first leg including first and second connected bridge diodes, and a second leg including third and fourth series connected bridge diodes, each leg connected to the first bus and the second bus, and configured to receive an input signal from the power source and to convert the input signal into a form usable by the switching section, the full bridge rectifier section integrated with the switching section, to provide the usable signal to the switching section and to contribute to operation of the switching section, wherein the HID ballast is a single stage device; and,
   a canceling device incorporated to selectively cancel a boosted high frequency voltage signal.

3. The HID ballast according to claim 2 wherein the canceling device is designed to be operational following transition from the startup operation.

4. The HID ballast according to claim 1 further including a canceling device incorporated to selectively cancel the boosted high frequency voltage signal.

5. The HID ballast according to claim 4 wherein the canceling device is designed to be operational following transition from the startup operation.

6. The HID ballast according to claim 1 wherein the boosted high frequency voltage signal is approximately 3 kv or greater.

7. An HID ballast powered by a power source, to control operation of a load, the HID ballast comprising:
- a switching section connected to a first bus and a second bus, and configured to output a high frequency voltage signal;
- a full bridge rectifier section having a first leg including first and second series connected bridge diodes, and a second leg including third and fourth series connected bridge diodes, each leg connected to the first bus and the second bus, and configured to receive an input signal from the power source and to convert the input signal into a form usable by the switching section, the full bridge rectifier section integrated with the switching section via a first feedback loop including a first feedback capacitor and a second feedback loop including a second feedback capacitor, to provide the usable signal to the switching section and to contribute to operation of the switching section, wherein the HID ballast is a single stage device; and,
- protection circuitry, wherein the protection circuitry detects at least one of over voltage or over current conditions.

8. The HID ballast according to claim 1 wherein the switching section is a two-switch inverter.

9. The HID ballast according to claim 1 wherein the load is an HID lamp.

10. The HID ballast according to claim 2 further including protection circuitry, wherein the protection circuitry detects at least one of over voltage or over current conditions.

11. The HID ballast according to claim 2 wherein the switching network is a two-switch inverter.

12. The HID ballast according to claim 2 wherein the load is an HID lamp.

13. The HID ballast according to claim 2 wherein the boosted high frequency voltage signal is generated by a high frequency level shifting circuit.

14. The HID ballast according to claim 2 wherein the canceling device is a canceling capacitor.

15. The HID ballast according to claim 1 wherein the second feedback loop is within the current path of the lamp.

16. The HID ballast according to claim 15 further including an active switching device which controls an amount of current feedback to the bridge converter section via the second feedback loop.

* * * * *